United States Patent [19]
Cooper et al.

[11] Patent Number: 5,870,139
[45] Date of Patent: *Feb. 9, 1999

[54] METHOD AND SYSTEM FOR VIDEO MULTIPLEXING

[75] Inventors: Alan Neal Cooper; David William Bauerle, both of Coppell; Merwyn Simpson, Farmers Branch, all of Tex.

[73] Assignee: Ultrak, Inc., Lewisville, Tex.

[*] Notice: This patent issued on a continued prosecution application filed under 37 CFR 1.53(d), and is subject to the twenty year patent term provisions of 35 U.S.C. 154(a)(2).

[21] Appl. No.: 519,879

[22] Filed: Aug. 28, 1995

[51] Int. Cl.$^6$ ......................................... H04N 7/18
[52] U.S. Cl. ...................... 348/159; 348/153; 348/212
[58] Field of Search ........................... 348/159, 151–155, 348/705, 211, 212, 213, 214, 500, 521, 143, 512, 516; H04N 7/18, 5/30, 5/225

[56] References Cited

U.S. PATENT DOCUMENTS

| | | | |
|---|---|---|---|
| 3,580,998 | 5/1971 | Hammond et al. | 178/6.8 |
| 3,811,008 | 5/1974 | Lee | 178/6.6 |
| 3,900,705 | 8/1975 | Richter | 178/6.8 |
| 4,037,250 | 7/1977 | McGahan et al. | 358/108 |
| 4,051,524 | 9/1977 | Baxter | 358/108 |
| 4,091,422 | 5/1978 | Amster | 358/210 |
| 4,218,709 | 8/1980 | Baxter et al. | 358/181 |
| 4,337,481 | 6/1982 | Mick et al. | 348/154 |
| 4,511,886 | 4/1985 | Rodriguez | 348/154 |
| 4,517,593 | 5/1985 | Keller et al. | 358/107 |
| 4,603,352 | 7/1986 | Kaneta et al. | 358/148 |
| 4,814,869 | 3/1989 | Oliver, Jr. | 358/108 |
| 4,943,854 | 7/1990 | Shiota et al. | 358/108 |
| 4,943,864 | 7/1990 | Elberbaum | 358/108 |
| 4,945,417 | 7/1990 | Elberbaum | 358/210 |
| 4,949,181 | 8/1990 | Elberbaum | 358/210 |
| 4,954,886 | 9/1990 | Elberbaum | 358/86 |
| 4,977,449 | 12/1990 | Morgan | 358/86 |
| 4,989,085 | 1/1991 | Elberbaum | 358/108 |
| 5,001,473 | 3/1991 | Ritter et al. | 340/825.52 |
| 5,237,408 | 8/1993 | Blum et al. | 358/108 |
| 5,239,376 | 8/1993 | Dittmann et al. | 358/101 |
| 5,243,425 | 9/1993 | Thompson | 358/148 |
| 5,249,051 | 9/1993 | Elberbaum et al. | 358/148 |
| 5,262,869 | 11/1993 | Hong | 348/211 |
| 5,264,929 | 11/1993 | Yamaguchi | 358/108 |
| 5,267,039 | 11/1993 | Elberbaum | 358/146 |
| 5,274,450 | 12/1993 | Elberbaum | 358/149 |
| 5,283,649 | 2/1994 | Elberbaum et al. | 348/500 |
| 5,293,231 | 3/1994 | Elberbaum et al. | 348/521 |

(List continued on next page.)

FOREIGN PATENT DOCUMENTS

| | | |
|---|---|---|
| 2704379-A1 | 4/1993 | France . |
| 357079781A | 5/1982 | Japan . |
| 2109198 | 4/1990 | Japan . |
| 4192780 | 7/1992 | Japan ............................. H04N 7/18 |
| 4287488 | 10/1992 | Japan . |

OTHER PUBLICATIONS

Elbex, Ltd., Catalog, Serial Video Series, Oct. 1995.
Elbex, Ltd., Catalog, Framelock Series, Oct. 1993.
Elbex, Ltd., What is I–D–Code?, Nov. 1995.

*Primary Examiner*—Michael Lee
*Attorney, Agent, or Firm*—Jenkens & Gilchrist, P.C.

[57] ABSTRACT

A plurality of video cameras each send a video signal and an audio signal to a video controller. Each of the video cameras receive a vertical drive signal and a horizontal drive signal from the video controller. A sensor interface sends sensor signals to the video controller. The video controller sends camera status signals to camera status indicators which indicate which of the video cameras are active. The video controller determines which of the video cameras are active, selects the video signals from one of the plurality of cameras, inserts a camera number code into the selected video signals which corresponds to the selected video camera, inserts indicator symbology into the selected video signals which represent the information from the status interface, and sends the selected video having the camera number code and the indicator symbology to a video recorder.

4 Claims, 9 Drawing Sheets

U.S. PATENT DOCUMENTS

| | | | |
|---|---|---|---|
| 5,335,014 | 8/1994 | Elberbaum | 348/159 |
| 5,361,096 | 11/1994 | Ohki et al. | 348/387 |
| 5,371,535 | 12/1994 | Takizawa | 348/15 |
| 5,389,968 | 2/1995 | Koyanagi et al. | 348/211 |
| 5,479,206 | 12/1995 | Ueno et al. | 348/211 |
| 5,508,737 | 4/1996 | Lang | 348/159 |
| 5,579,060 | 11/1996 | Elberbaum | 348/705 |
| 5,586,796 | 12/1996 | Johnson et al. | 364/550 |
| 5,621,729 | 4/1997 | Reese | 370/62 |
| 5,675,738 | 10/1997 | Suzuki et al. | 395/200.09 |
| 5,696,553 | 12/1997 | D'Alfonso et al. | 348/211 |

METHOD AND SYSTEM FOR VIDEO MULTIPLEXING

BACKGROUND

The present invention relates to camera systems, and more particularly, to multiplexing video camera systems.

Recently, there has been an increase in the need for recording images from multiple video cameras onto a single recording by switching from one video camera to another video camera during the recording process. However, often it is desired to distinguish between the images of the various video cameras when playing back the single recording made by this recording process. Therefore, there is a need for systems which can record the images from multiple video cameras onto a single recording with an identifying code for each image that indicates which of the video cameras the specific image came from.

Although video cameras record images, it is often desired to know additional information which is not readily seen from an image in the video camera. Therefore, there is a need for video multiplexing systems which also insert additional information on the images which are recorded.

SUMMARY

In one embodiment, the present invention is a device comprising: a plurality of video cameras; a plurality of camera detectors, each camera detector corresponding to one of said plurality of video cameras, wherein each of said plurality of camera detectors generates a camera status signal upon sensing that the corresponding video camera is an active camera; a video switcher for selecting the video signal from one of said plurality of video cameras; a timing controller for receiving the camera status signals from said plurality of camera detectors and causing the video switcher to select the video signal from one of said plurality of cameras that the timing controller receives a camera signal indicating that the particular one of said plurality of video cameras is an active camera, and for generating indicator symbology representing the status of a sensor; and a camera code and symbology encoder for inserting a camera number code corresponding to the video of the camera selected by the video switcher into a non-viewed line of the video of the camera selected by the video switcher, and for inserting the indicator symbology from the timing controller into the viewed line of the video of the camera selected by the video switcher.

In another embodiment, the present invention is a method comprising the steps of: selecting the video from one of said plurality of cameras; generating a camera number code corresponding to the selected one of said plurality of cameras for insertion into a line of video; receiving sensor signals and generating indicator symbology for insertion into a line of video, wherein said indicator symbology represents the status of the sensor signals; inserting the camera number code into a non-viewed line of the video of the selected one of said plurality of cameras; and inserting the indicator symbology into a viewed line of the video of the selected one of said plurality of cameras.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
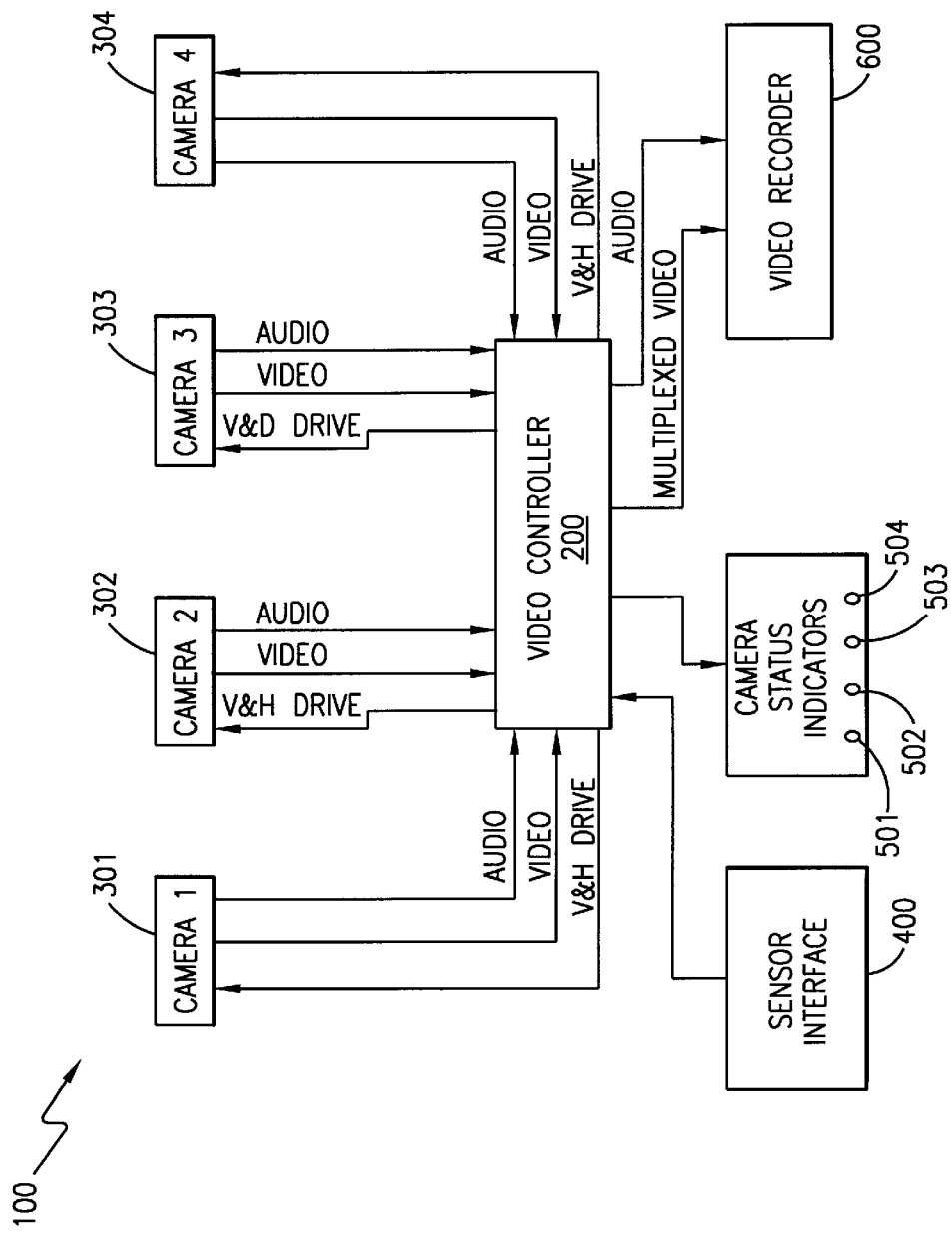
FIG. 1 is a block diagram of a video multiplexing system illustrating one embodiment of the present invention.

Referring now to the drawings, and more particularly to FIG. 1, there is shown a video multiplexing system 100 illustrating one embodiment of the present invention. The video multiplexing system 100 generally comprises a video controller 200, video cameras 301, 302, 303, and 304, a sensor interface 400, a camera status indicators 501, 502, 503 and 504, and a video recorder 600. Each of the video cameras 301, 302, 303, and 304, send a video signal and audio signal to the video controller 200. The video controller 200 sends a vertical drive signal and a horizontal drive signal to each of the video cameras 301, 302, 303, and 304. The sensor interface 400 interfaces with sensors which gather information in addition to the images from the video cameras 301–304 and sends sensor signals to the video controller 200. The camera status LED indicators 501, 502, 503, and 504 correspond to the video cameras 301, 302, 303, and 304, respectively. The video controller 200 sends camera activation signals to the camera status indicators 501–504. The video controller 200 also sends an output video signal and an output audio signal to the video recorder 600.

Figure 2:
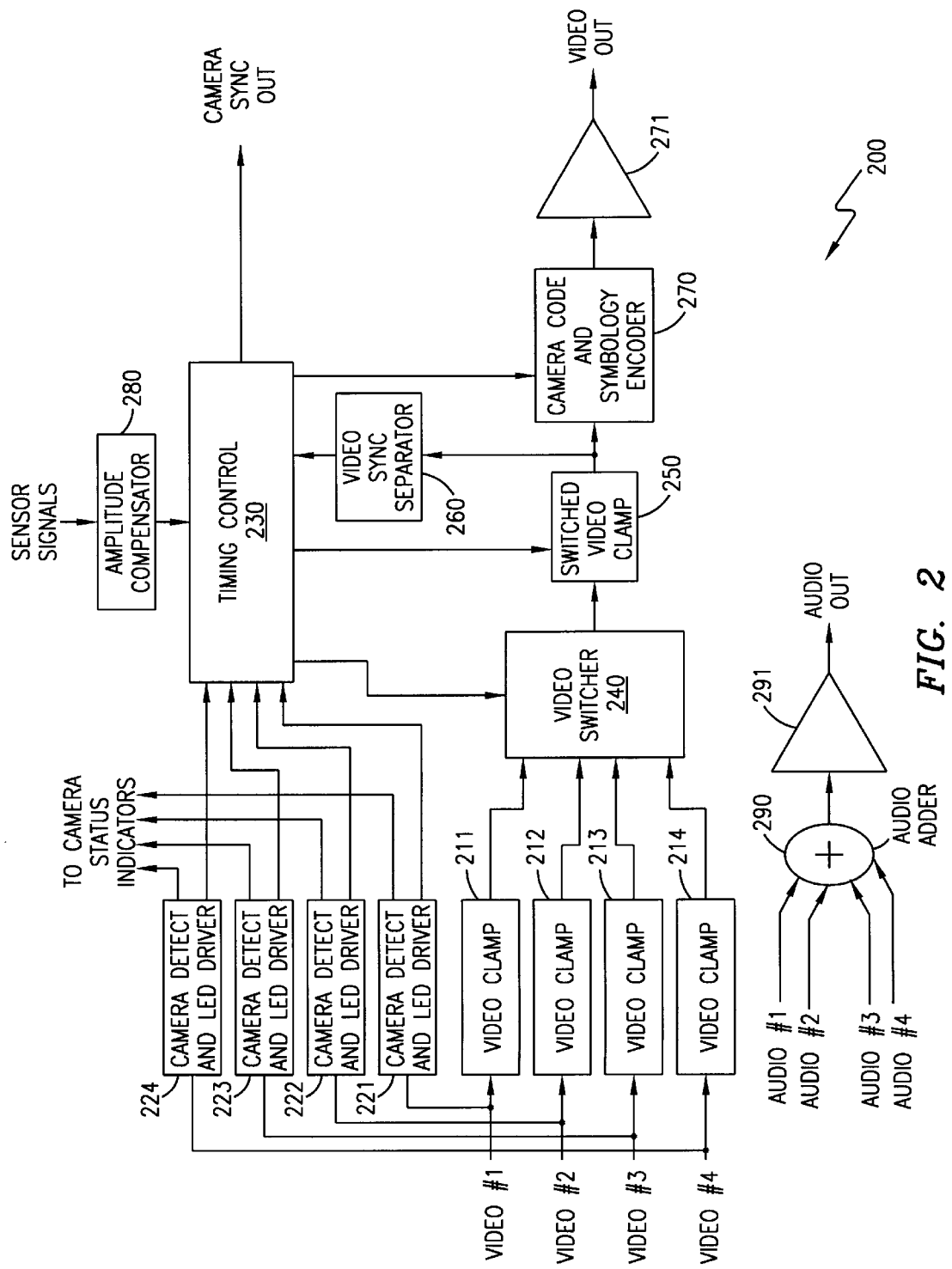
FIG. 2 is a block diagram illustrating one embodiment of the video controller block from the video multiplexing system of FIG. 1.

Referring now to FIG. 2, there is shown a block diagram illustrating one embodiment of the video controller 200 from the video mutiplexing system 100 of FIG. 1 The video controller 200 controls synchronization of the video cameras 301, 302, 303, and 304, automatically detects the number of the video cameras 301–304 that are active, and multiplexes between the active video cameras according to criteria pre-set in the video controller 200. The video controller 200 includes camera video clamps 211, 212, 213, and 214, camera detect and LED drivers 221, 222, 223, and 224, a timing controller 230, a video switcher 240, a switched video clamp 250, a video sync separator 260, a camera code and symbology encoder 270, an amplitude compensator 280, an audio adder 290, and buffers 271 and 291. The video signals from the cameras 301, 302, 303, and 304, are received by the camera video clamps 211, 212, 213, and 214, respectively, and the camera detect and LED drivers 221, 222, 223, and 224, respectively.

When the video cameras 301, 302, 303, or 304 are actively producing a video signal, the video signal produced by the respective video camera will include vertical synchronization intervals and horizontal synchronization pulses. Each of the camera detect and LED drivers 221, 222, 223, and 224, determine if synchronization signals are being received from the respective video camera 301, 302, 303, or 304, and then send a camera status signal to the timing controller 230 to indicate whether or not the respective video camera is an active camera. Each of the camera detect and LED drivers 221, 222, 223, and 224 also provide an LED drive signal, or camera activation signal, to the corresponding camera status indicator 501, 502, 503, or 504 when the an active camera is sensed from the corresponding video camera 301, 302, 303, or 304. When one of the camera status indicators 501–504 receives an LED drive signal from a particular camera detect and LED driver 221–224, the LED indicator 501–504 for the corresponding video camera 301–304 is illuminated. Although the embodiment illustrated herein uses LED indicators, a person of ordinary skill in the art will understand that other indicators can be used.

The video clamps 211, 212, 213, and 214 restore the synchronization pulses on the video signals from the video cameras 301–304 to a known DC value so that symbology and codes can be added to the video later. The video clamps 211–214 send the video signals with the standardized synchronization values to the video switcher 240. The video switcher 240 selects the video signal from one of the video cameras 301, 302, 303, or 304 to be the output of the video switcher 240 based upon a camera selection code provided by the timing control 230. The video signal from the video switcher 240 is received by the switched video clamp 250. The switched video clamp 250 corrects any DC level errors which were not corrected by the individual video clamps 211–214. In another embodiment, the camera video clamps 211–214 correct all DC level errors, eliminating the need for the switched video clamp 250 in the video controller 200. In yet another embodiment, the switched video clamp 250 corrects all DC level errors, eliminating the need for the camera video clamps 211–214 in the video controller 200.

The video from the switched video clamp 250 is received by the video sync separator 260 and the camera code and symbology encoder 270. The video sync separator 260 reads the vertical synchronization interval and the horizontal synchronization pulse from the video signal and sends those synchronization signals to the timing control 230 for generating the vertical drive signal and the horizontal drive signal.

The camera code and symbology encoder 270 places camera number and indicator symbology codes from the timing controller 230 on each frame or field of video in the video signal from the switched video clamp 250. The camera number codes placed on the video signal by the camera code and symbology encoder 270 correspond to the number of the video camera 301–304 that is selected by the video switcher 240. It is the camera number code that a video playback unit (not shown) uses to discern which camera 301, 302, 303, or 304 generated a current frame or field of video.

Sensor signals from the sensor interface 400 are supplied to the amplitude compensator 280. The amplitude compensator 280 converts the amplitude of the sensor signals from the sensor interface 400 into an amplitude useable by the timing controller 230, such as converting the amplitudes of a standard RS 232 type signal into the amplitudes of a TTL type signal. The timing controller 230 uses the signals from the amplitude compensator 280 to generate indicator symbology which represent the status of the sensors (not shown) connected to the sensor interface 400. The indicator symbology from the timing controller 230 are provided to the camera code and symbology encoder 270 and placed on each frame or field of video in the video signal from the switched video clamp 250. The video signal from the camera number code and symbology encoder 270, having the camera number code and the indicator symbology thereon, is output from the video controller 200 through the buffer 271 as the output video signal of the video controller 200.

The audio adder 290 receives the audio signals from the video cameras 301–304 and differentially adds those audio signals into a single audio output signal. The single output audio signal from the audio adder 280 is output from the video controller 200 through the buffer 291 as the audio output signal of the video controller 200.

Figure 3:
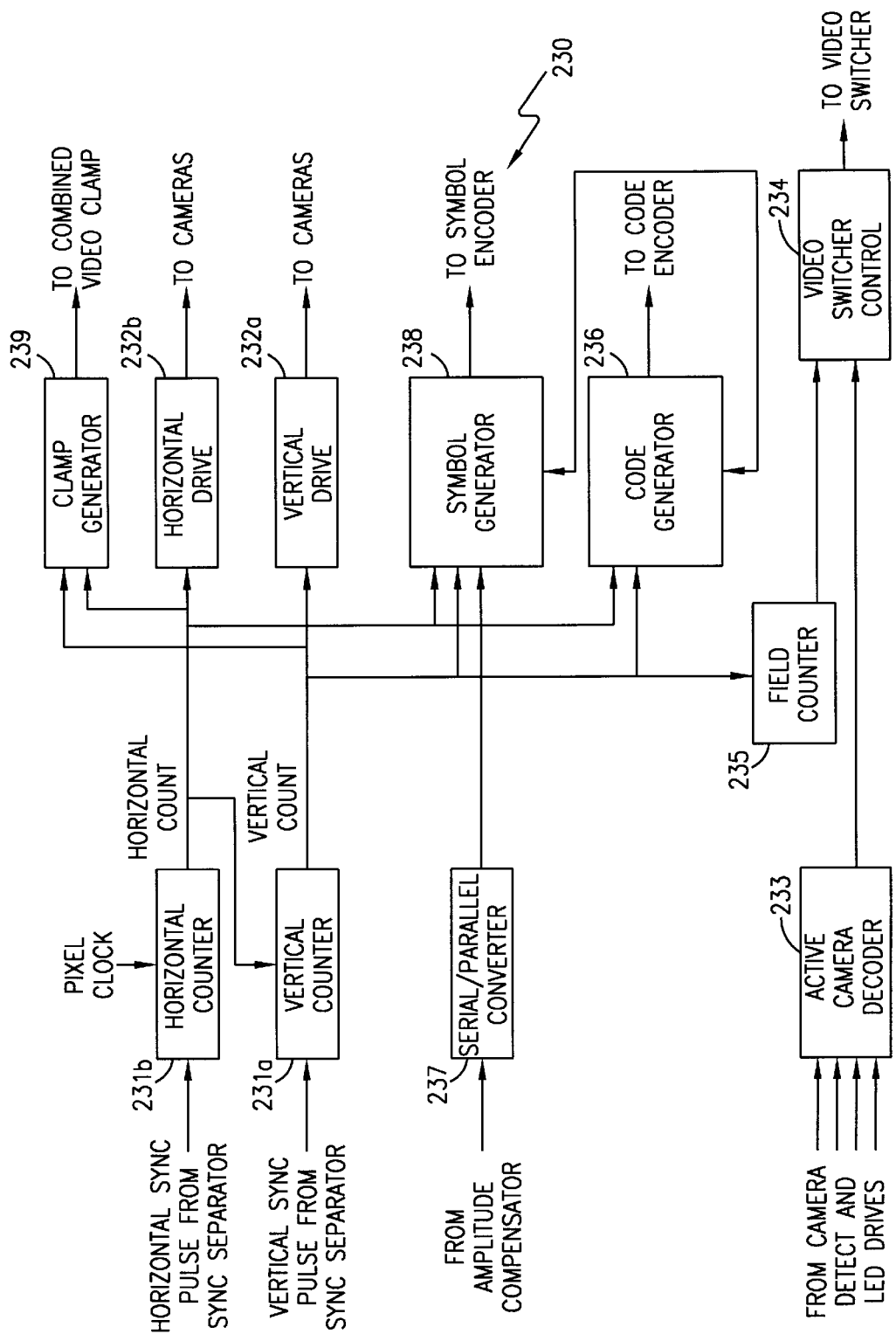
FIG. 3 is a block diagram illustrating one embodiment of the timing controller from FIG. 2.

Referring now to FIG. 3, there is shown a block diagram illustrating one embodiment of the timing controller 230 from FIG. 2. In one embodiment, the timing controller 230 is a programmable logic device which is programed to have the functional blocks of a vertical counter 231a, a horizontal counter 231b, a vertical drive 232a, a horizontal drive 232b, active camera decoder 233, a video switcher control 234, a field counter 235, a code generator 236, a serial/parallel converter 237, a symbol generator 238, and a clamp generator 239.

The vertical synchronization signal and horizontal synchronization signal from the video sync separator 260 are received by the vertical counter 231a and the horizontal counter 231b, respectively, of the timing controller 230. The horizontal counter 231b receives a signal from a PIXEL CLOCK (not shown) to determine the location of the system in between the horizontal counts. The vertical counter 231a receives the horizontal count from the horizontal counter 231b to determine location of the system in between the vertical counts. The output of the vertical counter 231a and the horizontal counter 231b are used by the code generator 236, the symbol generator 238, and the clamp generator 239 to determine the exact time to perform their respective functions. The output of the vertical counter 231a is also used by the field counter 235 to determine the exact time to perform its functions.

The active camera decoder 233 reads the camera status signals coming from the camera detection and LED drives 221–224 to determine which of the video cameras 301–304 are active cameras. The active camera decoder 231 sends an active camera signal to the video switcher control 234 indicating which of the video cameras 301–304 are active cameras. The field counter 235 sends a change camera signal to the video switcher control 234 upon receiving a predetermined number of vertical count signals from the vertical counter 231a. Upon receiving a change camera signal from the field counter 235, the video switcher control 234 sends a camera selection code to the video switcher 240 instructing the video switcher 240 to select the next active one of the video cameras 301–304, as indicated to the video switcher control 234 by the active camera decoder 233.

The code generator 236 receives the camera selection code from the video switcher control 234. The code generator 236 uses the camera selection code to generate the corresponding camera number code sent to the camera code and symbology encoder 270 by the timing controller 230. The serial/parallel converter 237 receives the sensor signals from the amplitude compensator 280 and converts the sensor signals from series signals to parallel signals. The parallel signals from the serial/parallel converter 237 are transmitted to the symbol generator 238. The symbol generator 238 uses the parallel signals from the serial/parallel convertor 237 to generate the indicator symbology supplied by the timing controller 230 to the camera code and symbology encoder 270. The symbol generator 238 also receives the camera select code from the video switcher control 234 and uses the camera selection code to generate camera indicator symbology into the video picture by the camera code and symbology encoder 270, that indicates which video camera 301–304 generated the current frame or field of video.

The vertical drive 232a uses the vertical count from the vertical counter 237 to generate the vertical drive signal which is transmitted by the timing controller 230 to the video cameras 301–304. The horizontal drive 232b uses the horizontal count from the horizontal counter 237b to generate the horizontal drive signal which is transmitted by the timing controller 230 to the video cameras 301–304. The video cameras 301–304 use the vertical drive signal and the horizontal drive signal from the vertical drive 232a and the horizontal drive 232b to synchronize the timing of the video cameras 301–304. In one embodiment, the video multiplexing system 100 uses the timing controller 230 and the video sync separator 260 to synchronize the timing of the video cameras 301–304 in the same manner as the system and method of synchronizing video cameras as disclosed in the co-pending U.S. patent application number [not yet assigned but filed under attorney docket number 27761-00037] entitled "SYSTEM AND METHOD FOR SYNCHRONIZATION OF MULTIPLE VIDEO CAMERAS" filed on Aug. 28, 1995, by co-inventors Neal Cooper and David Bauerle, which is hereby specifically incorporated in its entirety by reference thereto.

The clamp generator 239 generates the clamping signal which is supplied to the switched video clamp 250. The clamp generator 239 commands the switched video clamp 250 to clamp the video signal at the appropriate time as indicated by the vertical count and the horizontal count from the horizontal counter 231a and the horizontal counter 231b.

Figure 4:
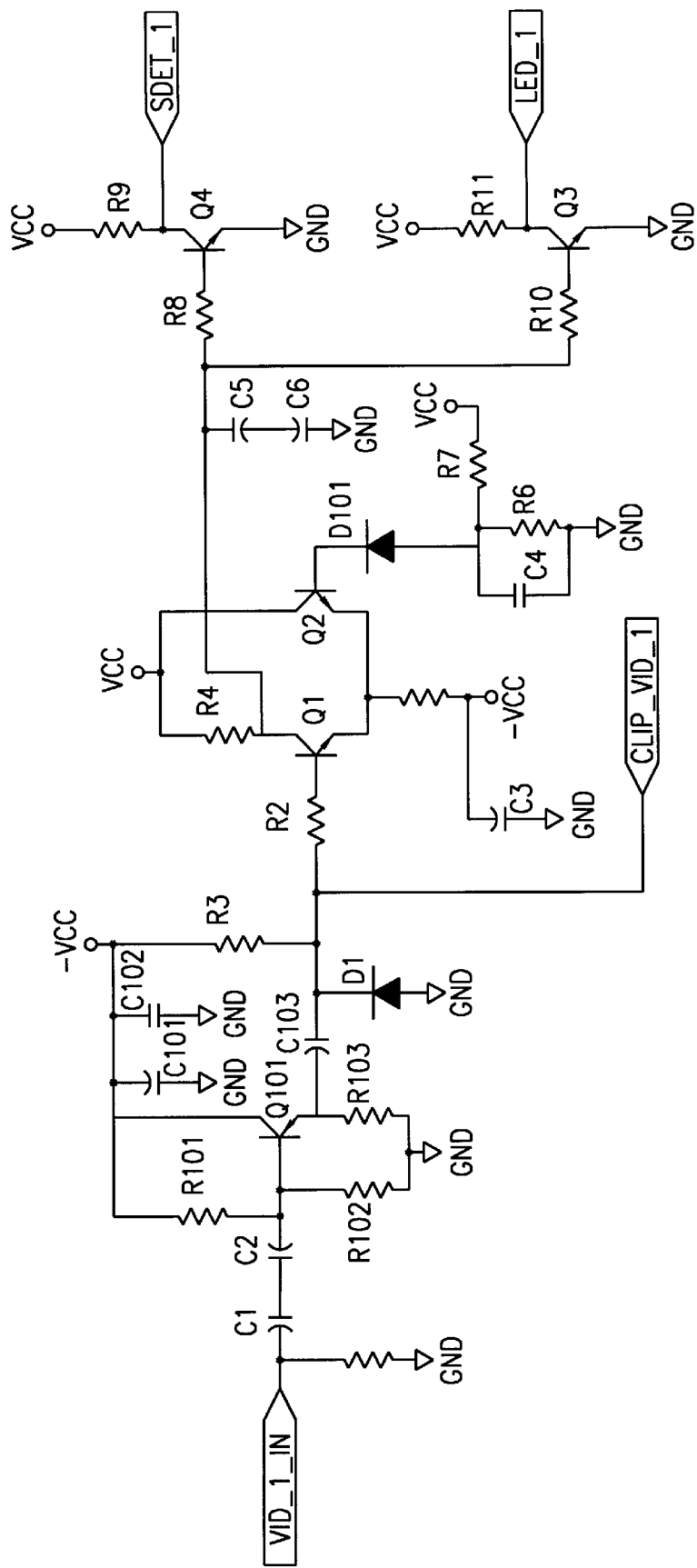
FIG. 4 is a schematic illustrating one embodiment of the video clamp and the camera detect and LED driver from FIG. 3 for one of the video camera units in FIG. 2.

In FIG. 4 is a schematic illustrating one embodiment of the camera video clamp 211 and the camera detect and LED driver 221 for the camera 301. It is to be understood that the video clamp and camera detect and LED driver for the cameras 302, 303 and 304 can use substantially the same circuit as illustrated in FIG. 4. A capacitor C103, a diode D1, and a resistor R3 form a negative peak clamp which perform the synchronization pulse clamping of the camera video clamp 211. Since the synchronization signals from the video of camera 301 are known to be the most negative voltage of the video signal, the capacitors will be charged to a point where the synchronization signals are one diode drop below ground (approximately −0.6 volts). The amplitude of the synchronization signals being known, the video signal has a known DC amplitude offset. The clamped video signal (CLP_VID_1) is the video signal sent to the video switcher 240 by the camera video clamp 211.

A transistor Q1 and a transistor Q2 form the camera detect circuit of the camera detect and LED driver 221 illustrated in FIG. 4. Resistors R6 and R7, and diode D101, supply a reference DC voltage to the base of the transistor Q2. If the voltage into the resistor R2 exceeds the base voltage of the transistor Q2, then the transistor Q1 will turn "ON" and the collector of the transistor Q1 will be pulled to a negative voltage. This then turns "OFF" a transistor Q3 and a transistor Q4, which make up the LED drive circuit for the camera detect and LED driver 221. With the transistor Q3 and the transistor Q4 "OFF", the LED drive circuit will be "ON" sending the camera activation signal over LED_1 to the camera status activation signal, and a VCC voltage will be sent by the camera code and symbology encoder 270 to the timing controller 230 as the camera status signal (SDET_1). An "ON" condition of the LED drive circuit signifies that the video camera 301 is active on the video input of the camera detect and LED driver 221. If the voltage into the resistor R2 does not exceed the base voltage of the transistor Q2, the transistor Q1 will turn "OFF" and the voltage of collector of the transistor Q2 will be approximately equal to the VCC voltage. This then turns "ON" the transistor Q3 and the transistor Q4. With the transistor Q3 and the transistor Q4 "ON", the LED drive circuit will be "OFF" sending no camera activation signal over LED_1 to the camera status indicator 501, and a zero voltage signal will be sent by the camera code and symbology encoder 270 to the timing controller 231 as the camera status signal (SDET_1). An "OFF" condition of the LED drive circuit signifies that the video camera 301 is not active on the video input of the camera detect and LED driver 221.

Figure 5:
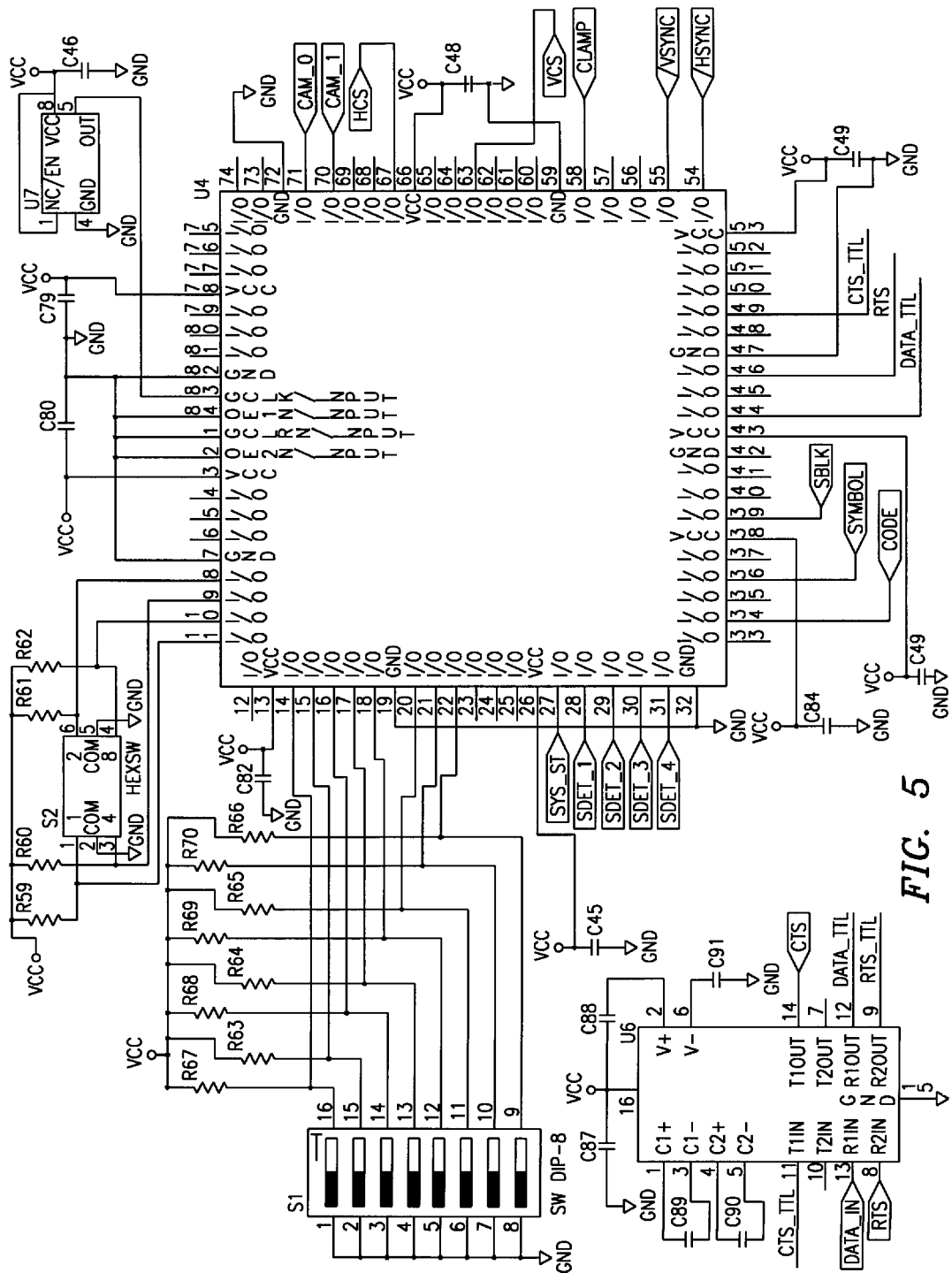
FIG. 5 is a schematic diagram illustrating one embodiment of the timing controller and the amplitude compensator from the video controller of FIG. 2.

In FIG. 5 is shown a schematic illustrating one embodiment of the timing controller 230 and the amplitude compensator 280. An interface device U6 of the amplitude compensator 280 receives the sensor signals from the sensor interface 400 through a DATA_IN. In one embodiment, the interface device U6 is a RS 232 Driver/Receiver model number MAX232A manufactured by Maxium Integrated Products located in Sunnyvale, Calif. A RTS and a CTL provide handshake signals between the sensor interface 400 and the amplitude compensator 280. The amplitude compensator 280 sends the sensor signals with the corrected amplitude to the timing controller 230 through a DATA_TTL, and the handshake signals through RTS_TTL and CTS_TTL.

A programmable logic device (PLD) U4 of the timing controller 230 illustrated in FIG. 5, is used to control all functions of the systems, such as, video switching, symbology generation, camera number code generation, etc. In one embodiment, the PLD is a commercial programmable logic device such as the MAX EPM7128 Programmable Logic Device manufactured by ALTERA which is located in San Jose, Calif. The PLD U4 receives the vertical and horizontal synchronization signals from the video sync separator 260 through a /VSYNC and a /HSYNC, respectively. The PLD U4 receives the camera status signals from the camera detect and LED drivers 221, 222, 223, and 224 at SDET_1, SDET_2, SDET_3, and SDET_4, respectively, and sends the camera selection code to the video switcher 240 through a CAM_0 and a CAM_1. The PLD U4 sends the clamping signal of the timing controller 230 to the switched video clamp 250 through CLAMP. The camera number codes and indicator symbology of the timing controller 230 are sent to the camera code and symbology encoder 270 through CODE, SYMBOL, and SBLK of the PLD U4. The vertical drive signal and the horizontal drive signal of the timing controller 230 are sent to the video cameras through /VSYNC and /HSYNC of the PLD U4. A DIP switch S1 determines the configuration of the system. The DIP switch specifies the type of multiplexer used to view the signals recorded by the video recorder 600, and configures the system to accommodate the specific multiplexer in the viewing system. A hexadecimal switch S2 allows a user to select the number of vertical counts received by the field counter 235 before the field counter 235 sends a change camera code to the video switcher control 234. In this manner, the user can select a number of fields or frames of video recorded for each camera per cycle of switching.

Figure 6:
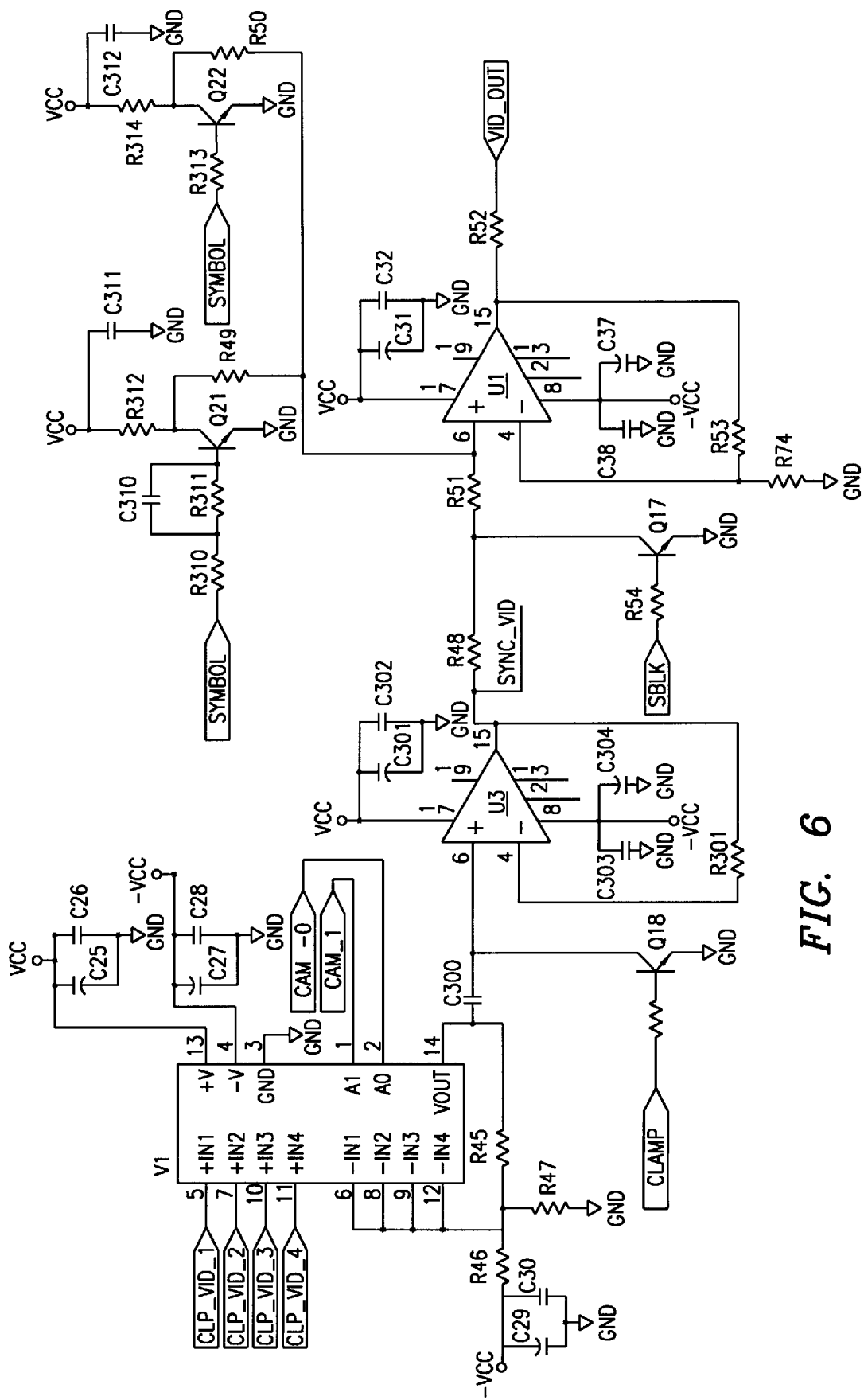
FIG. 6 is a schematic illustrating one embodiment of the video switcher, the switched video clamp, and the camera code and symbology encoder from FIG. 2.

In FIG. 6 is shown a schematic illustrating one embodiment of the video switcher 240, the switched video clamp 250, and the camera code and symbology encoder 270. A multiplexer U1 of the video switcher 240 is a four to one video multiplexing device that allows one of the four cameras to be recorded. In one embodiment, the multiplexer U1 is a commercial multiplexer such as the Multiplexed Input Video Amplifier model EL4444 manufactured by élantec which is located in Milpitas, Calif. Although the multiplexer U1 is a four to one video multiplexer, a person of ordinary skill in the art will understand that the multiplexer U1 can be modified to accommodate any number of video cameras. The timing control 230 sends the camera select code (CAM_0 and CAM_1) to the video switcher 240 which directs the video switcher to select the particular video camera 301 that is to be recorded.

A transistor Q18, and an amplifier U3 in FIG. 6 form the switched video clamp 250. The clamping signal from the timing controller 230 is received by the switched video clamp at CLAMP. The transistor Q18 turns "ON" when the clamp signal from the timing controller 230 goes high. The high condition of the clamp signal from the timing controller 230 occurs when the non-viewed or blanked portion of each horizontal line of video occurs. When the transistor Q18 is "ON", it charges the capacitor C300 to a voltage that results in zero volts DC into the device Q3 during the non-viewed or blanking time. This action clamps the video blanking level to ground for each horizontal line of video. The clamping removes any DC differences between the video signal from the switched video clamp 250 and the predetermined standard level which was not removed by the individual camera video clamps 211–214.

In the embodiment illustrated in FIG. 6, the video sync separator 260 receives the video signal from SYNC_VID. In one embodiment, the video sync separator is a commercial sync separator, such as the Video Sync Separator model EL4583C manufactured by élantec, located in Milpitas, Calif.

The camera number codes and indicator symbology from the timing controller 230 are received by the camera code and symbology encoder 270 at CODE, SYMBOL, and SBLK of the embodiment in FIG. 6. An amplifier U2 is used as a summing point of the camera code and symbology encoder 270 to insert the camera number code and the indicator symbology from the timing controller 230 onto the video signal from the switched video clamp 250. A switching transistor Q17 is controlled by the timing controller 230 to stop video from the switched video clamp 250 while the camera number codes and indicator symbology are being injected onto the video signal. When the switching transistor Q17 is "ON", the node between a resistor R48 and a resistor R51 is effectively grounded so that no video signal is passed on to the amplifier U2.

Figure 9:
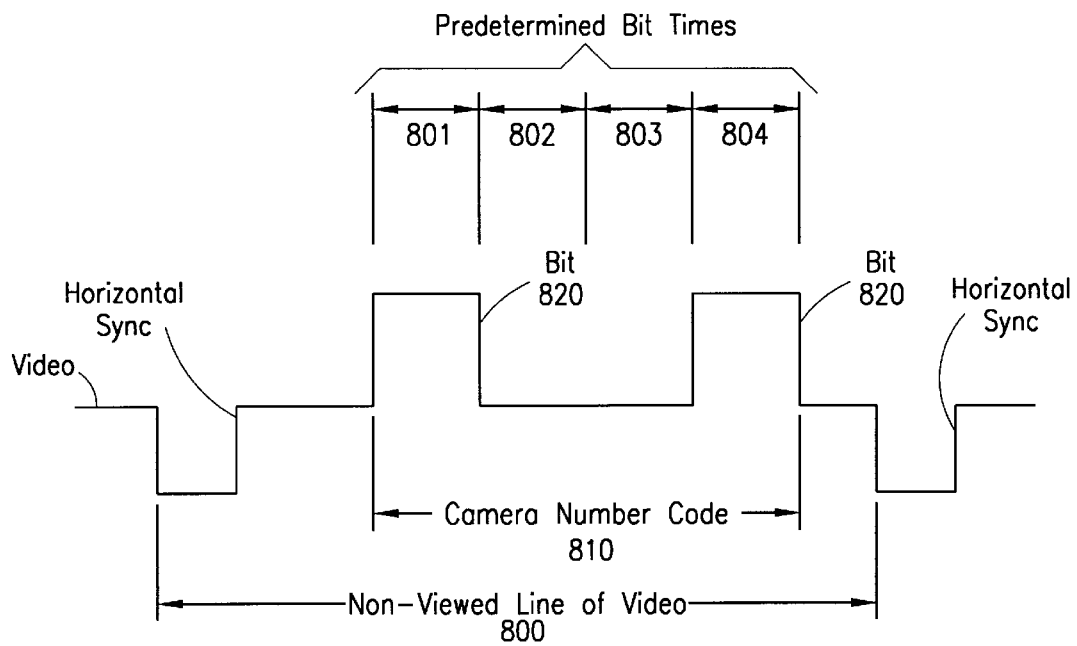
FIG. 9 is a non-viewed line of video having bits of a camera number code thereon.

The camera number codes from the timing controller 230 to the camera code and symbology encoder 270 of the embodiment illustrated in FIG. 6, are placed into the non-viewed lines of video 800 illustrated in FIG. 9 at a resistor R313. Each of the camera number codes 810 to be place in the non-viewed lines of video 800 are made up of bits 820. The bits 820 of a camera number code 810 are inserted into predetermined bit locations 801, 802, 803, and 804 of non-view video line 800. During the time of the nonviewed line of video 800 when the bits 820 of a camera number code 810 are not to be placed in the line of video 800, the CODE signal is at five volts, which turns "ON" the switching transistors Q22. When the switching transistor Q22 is "ON", a resistor R50 is effectively shorted to ground, and no bit 820 is inserted into the non-viewed video line 800. During the predetermined bit time 801, 802, 803, and 804 when a bit 820 of a camera number code 810 is to be inserted into the non-viewed line of video 800, the CODE signal goes to zero volts, and the transistor Q22 is "OFF", putting a DC voltage into the resistor R50. The DC voltage in the resistor R50 passes through into the video stream at the appropriate level. While the transistor Q22 is "OFF", the SBLK signal is +5 volts so that a transistor Q17 is "ON" and blocks the incoming video signal. The camera number code 810 is changed by inserting bits 820 into different predetermined bit times 801, 802, 803, and 804 of a nonviewed video 800 for different camera codes 810.

Figure 10:
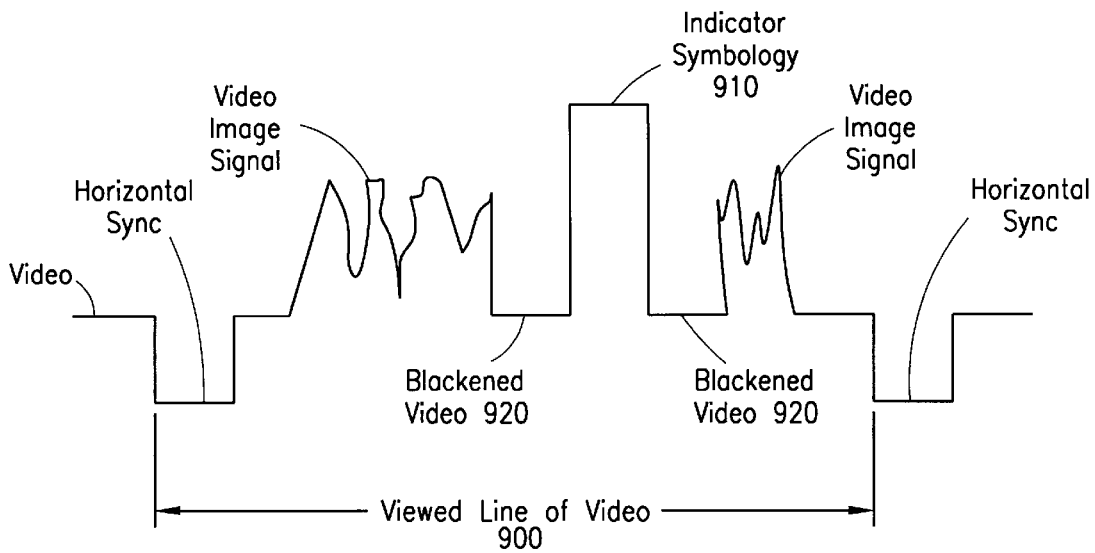
FIG. 10 is a viewed line of video having indicator symbology and blackened portions thereon.

The indicator symbology from the timing controller 230 to the camera code and symbology encoder 270 of the embodiment illustrated in FIG. 6, is placed into each viewed line of video 900 illustrated in FIG. 10, at a resistor R310. During the time when indicator symbology is not to be placed in the viewed line of video 900, the SYMBOL signal is at five volts, which turns "ON" the switching transistor Q21. When the switching transistor Q21 is "ON", a resistor R49 is effectively shorted to ground, and no indicator symbology 910 is inserted into the viewed line of video 900. During the time when the indicator symbology 910 is to be inserted into the line video 900, the SYMBOL signal goes to zero volts and transistor Q21 is "OFF", putting a DC voltage into the resistor R49. The DC voltage in resistor R49 is passed as the indicator symbology 910 through into the viewed line of video 900 at the appropriate level. The blackened portions 920 of the video 900 are inserted into the video 900 when the transistor Q17 is "ON". The transistor Q17 is turned "ON" when the SBLK signal from the timing controller 230 is five volts. The transistor Q17 must also remain "ON" during the time period that the indicator symbology 910 is inserted into the line of video 900 so that the video from the switched video clamp 250 is blocked. The camera code and symbology encoder 270 performs these actions for each viewed line of video 900 having the indicator symbology 910 thereon. The camera code and symbology encoder 270 can also perform these functions more than once on each viewed line of video 900 for generating more than one indicator symbology 810 on the viewed line of video 900.

The camera number codes and the sensor symbology are inserted into the lines of video at the times determined by the timing controller 230. The final multiplexed video signal, containing the camera number codes and the indicator symbology, is sent to the video recorder 600 by the video controller 200. The output video, having the camera number codes and the indicator symbology, leaves the camera code and symbology encoder 270 at VID_OUT in the embodiment of FIG. 6.

Figure 7:
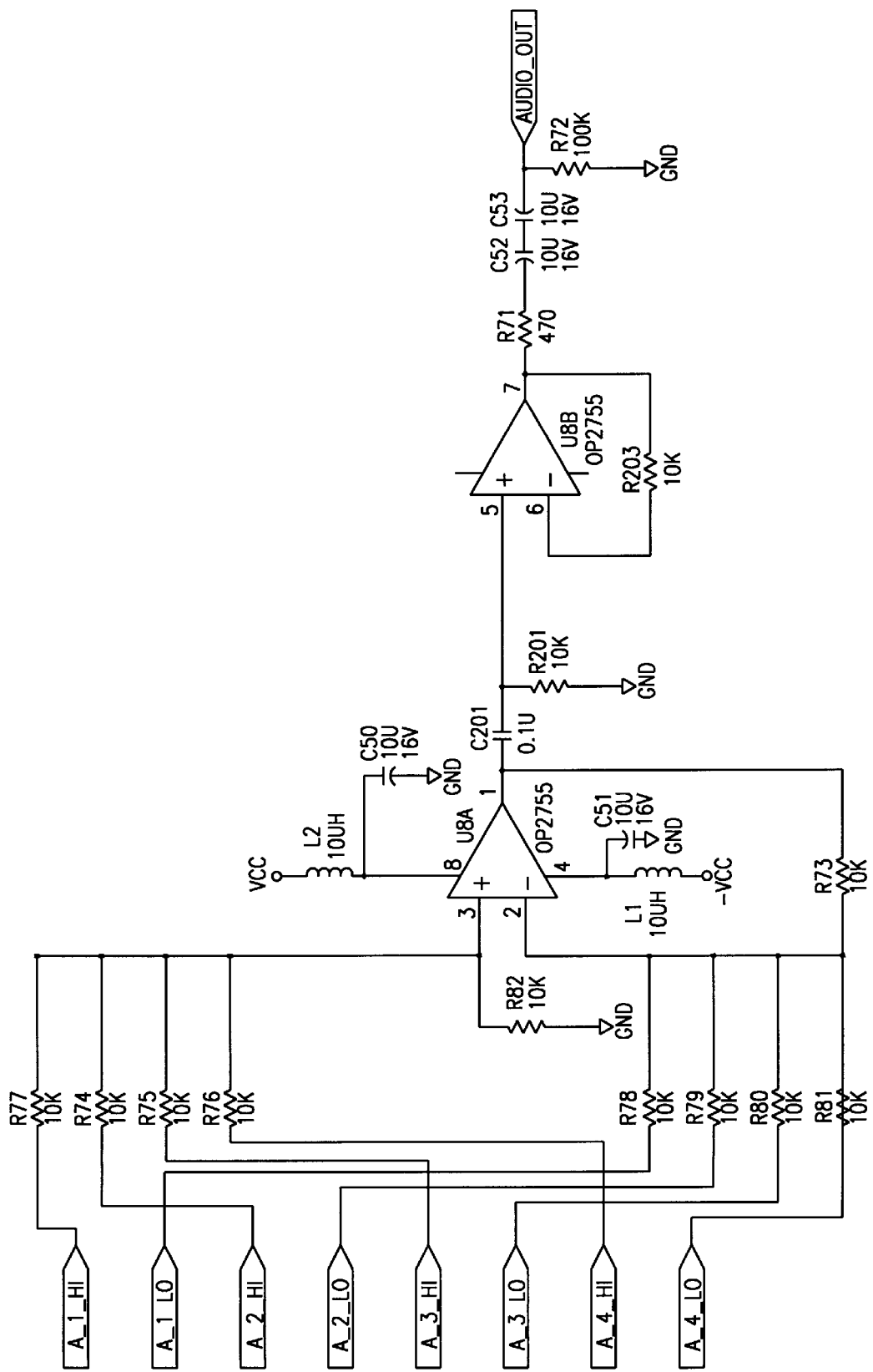
FIG. 7 is a schematic illustrating one embodiment of the audio adder and the buffer from FIG. 2.

In FIG. 7 is illustrated a schematic of one embodiment of the audio adder 290 and the buffer 291. The audio signal from each of the video cameras 301–303 is added together at the amplifier U8A to form a single audio output that contains the audio signal from all of the video camera 301–303. The combined audio signal is then sent to the video recorder 600 by the video controller 200.

Figure 8:
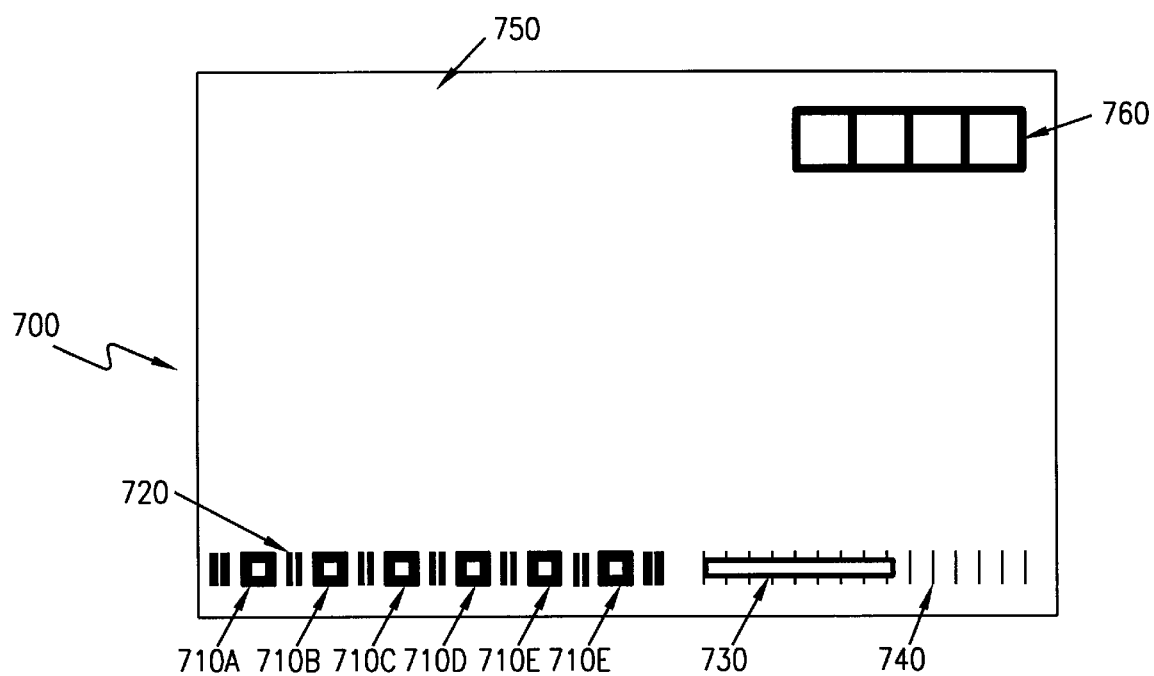
FIG. 8 illustrates a screen image of a recording made by the video multiplexing system of FIG. 1.

In FIG. 8 is illustrated one embodiment of a played back video screen 700 by a video playback device (not shown) playing back the video signal recorded by the video recorder 600. Indicator status symbology 710a–f on the video screen 700 are separated by status indicator dividers 720. The indicator status symbology 710a–f is individually controlled by the video multiplexing system 100 and can represent any on/off information such as vehicle brake lights, warning lights, turn signals, etc. A bar graph 730 grows from left to right proportionate with a varying condition recorded by the sensor interface 400 of the video multiplexing system 100. Bar graph dividers 740 indicate the progress of the bar graph 730. The bar graph 730 can indicate any variable condition such as the speed of a vehicle containing a video multiplexing system. A video recorder information area 750 is reserved for the display of information recorded by the video recorder 600 such as, a timer, date, counter, etc. The camera indicator symbology 760, placed on the video picture by the video camera code and symbology encoder 270, displays the number of the video camera 301–304 which generated the frame or field being viewed. The status indicator symbology 710*a–f,* status indicator divider 720, bar graph 730, dividers for bar graph 740, and camera indicator symbology 760 are displayed on a black border created by the video controller 200 of the video multiplexing system 100. By displaying the status indicator symbology 710*a–f,* status indicator divider 720, bar graph 730, bar graph dividers 740 and camera indicator symbology 760 on a black border, the information is visible with any background scene.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

what is claimed is:

1. A device comprising:
   a plurality of video cameras of the type that generate video signals with synchronization signals and are synchronized by an external camera synchronization signal;
   a video switcher for being coupled to the plurality of video cameras to receive the video signals therefrom and for selecting the video signals from one of said plurality of cameras as a selected camera output;
   a video synchronization separator for reading the synchronization signals in the selected camera output from said video switcher and for having an output of a selected video synchronization signal corresponding to the synchronization signals in the selected camera output of said video switcher;
   a timing controller for receiving the selected video synchronization signal from said video synchronization separator and for supplying to said plurality of video cameras the camera synchronization signal timed to the selected video synchronization signal from said video synchronization separator; and
   a plurality of camera detectors, each camera detector associated with a different one of said plurality of video cameras, wherein each of said plurality of camera detectors generates an active camera status signal upon sensing that the corresponding video camera is actively generating a video signal, wherein said timing controller receives the camera status signals from said plurality of camera detectors and generates a camera selection code corresponding to one of said plurality of video cameras that the timing controller receives the active camera status signal from the associated camera detector indicating that the associated video camera is actively generating a video signal, wherein said video switcher receives the video signal from the video camera corresponding to the camera selection code as the selected camera output.

2. The device of claim 1, wherein said plurality of camera detectors detect if the associated video camera is actively generating video signals by determining if the associated video camera is actively generating a synchronization signal.

3. A method for providing a camera synchronization signal to a plurality of video cameras of the type that generate video signals with synchronization signals, comprising the steps of:
   selecting the video signals from one of said plurality of video cameras;
   reading the synchronization signals from the selected video signals and outputting a selected camera synchronization signal corresponding to the synchronization signals in the selected video signals;
   timing the camera synchronization signal to the selected video synchronization signal;
   providing to said video cameras the camera synchronization signal timed to the selected video synchronization signal for use by the plurality of video cameras;
   detecting which ones of the plurality of video cameras are actively generating video signals;
   generating a camera selection code corresponding to at least one of said plurality of video cameras that are actively generating video signals; and
   selecting the video signal from one of said plurality of video cameras corresponding to the camera selection code.

4. The method according to claim 3, wherein said step of detecting includes determining which ones of the video cameras are actively generating a synchronization signal and is therefore actively generating video signals.

* * * * *